United States Patent Office 3,560,524
Patented Feb. 2, 1971

3,560,524
PREPARATION OF EPISULFIDES FROM EPOXIDES
Donald L. Clason, Mentor, and Lester E. Coleman, Willoughby Hills, Ohio; said Clason assignor to The Lubrizol Corporation, Wickliffe, Ohio
No Drawing. Filed Nov. 26, 1968, Ser. No. 779,260
Int. Cl. C07d 41/06, 59/00
U.S. Cl. 260—327                                    5 Claims

ABSTRACT OF THE DISCLOSURE

Epoxides are converted into episulfides in excellent yield by reaction with a thiolactam having 5–7 atoms in the ring. 2-thiopyrrolidone and ε-thiocaprolactam, especially the former, are preferred.

---

This invention relates to chemical processes, and more particularly to a novel method for the preparation of episulfides. Said method comprises reacting an epoxide with a thiolactam of the formula

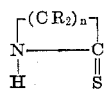

wherein each R is individually hydrogen or a lower alkyl radical and $n$ is an integer from 3 to 5. As used herein, the term "lower alkyl radical" denotes alkyl radicals containing 5 carbon atoms or less.

Episulfides are becoming of increasing interest as monomers and intermediates for the preparation of many chemical compounds, especially polymeric and resinous compounds and trithiocarbonates. They are also useful as oxidation inhibitors.

Known methods for the preparation of episulfides include thermal dehydration of hydroxy mercaptans, treatment of 1,2-chlorothiols with alkali, reaction of olefins with sulfur or a sulfide, and reaction of epoxy compounds with a thiocyanate, carbon disulfide, carbon oxysulfide or any of several thioamides such as thiourea, thioacetamide, xanthamide or thiobarbituric acid. None of these methods give very high yields of episulfide, and the product is usually contaminated with many by-products and impurities from which separation is difficult.

A principal object of the present invention, therefore, is to provide an improved method for the preparation of episulfides.

A further object is to provide an episulfide preparation method which results in increased yields of the episulfide with a minimum of by-product formation.

A further object is to prepare compositions of matter suitable for a number of chemical applications.

Other objects will in part be obvious and will in part appear hereinafter.

The starting materials used for the preparation of episulfides according to the method of this invention include, in general, those compounds containing one or more epoxy groups. These compounds may be represented by the formula

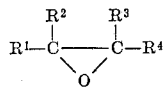

wherein each of $R^1$, $R^2$, $R^3$ and $R^4$ is hydrogen or a hydrocarbon radical. The term "hydrocarbon radical" includes substantially hydrocarbon radicals; that is, radicals containing substituent groups which do not themselves react with the epoxy group or the other reagents under the conditions of the reaction. These may include, for example, ether, ester, nitro and amide groups. The preferred epoxides are those in which $R^2$ and $R^3$ are hydrogen and each of $R^1$ and $R^4$ is an alkyl radical or an alkyl radical containing ether or ester groups. These may be exemplified by ethylene oxide, propylene oxide, 1,2-butylene oxide, glycidyl esters of carboxylic acids, glycidyl ethers, epoxidized derivatives of oleic acid esters such as butyl epoxystearate, and the like. Also usable are aromatic epoxides such as styrene oxide and substituted styrene oxides.

The compound reacted with the epoxide is a thiolactam containing 5–7 atoms in the ring. Preferred are 2-thiopyrrolidone and ε-thiocaprolactam. Of these, 2-thiopyrrolidone is generally superior because it affords somewhat better yields under less severe conditions. Alkyl-substituted 2-thiopyrrolidones, ε-thiocaprolactams and the like may also be used, but it has been found that there is a marked decrease in product yield and purity if the nitrogen atom contains a substituent. Therefore, although some episulfide may be formed by the reaction of an N-substituted compound such as N-methyl-2-pyrrolidone with an epoxide, the present invention only contemplates the use of thiolactams containing a hydrogen bonded to nitrogen.

The method of this invention is carried out by simply mixing the two reagents, preferably in the presence of an inert solvent such as benzene, toluene, xylene, hexane, ethylene glycol dimethyl ether, tetrahydrofuran or the like and heating to about 70–130° C. It is frequently convenient to employ a solvent which boils in this temperature range and to carry out the reaction under reflux. The time required is generally about 1–10 hours. The mole ratio of epoxide to thiolactam is conveniently about 1:1 but may be between about 1:2 and 2:1.

Following the reaction, the by-product lactam may be removed by extracting with water or by any other suitable method, and the organic solution may be concentrated and the desired episulfide isolated by distillation, crystallization or a similar method. Generally, the episulfide will be contaminated with some unreacted epoxide, but for many applications the removal of this unreacted epoxide is unnecessary.

The method of this invention is illustrated by the following examples. All parts are by weight.

EXAMPLE 1

A mixture of 50.5 parts (0.5 mole) of 2-thiopyrrolidone and 150 parts of benzene is heated to 74° C. and heating is continued until a clear solution is formed. An addition funnel is charged with 122.5 grams (0.5 mole) of the glycidyl ester of a tertiary carboxylic acid of the formula

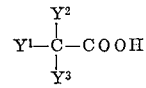

wherein each of $Y^1$, $Y^2$ and $Y^3$ is a saturated aliphatic radical, at least one of the three being a methyl radical, and the Y radicals have a total of 7–9 carbon atoms. The glycidyl ester is added to the 2-thiopyrrolidone solution over 10 minutes at 64–74° C. The mixture is then heated to reflux for about 4½ hours.

The clear yellow liquid thus obtained is washed with four successive portions of water and the solvent is removed by stripping at 128° C./15 min. The residue is filtered, yielding 125 parts of a light yellow liquid which is the desired product, the thioglycidyl ester of the carboxylic acid.

EXAMPLE 2

To a solution of 50.5 parts (0.5 mole) of 2-thiopyrrolidone in 100 parts of benzene, maintained at 67° C., is added, over 4 minutes, 94.5 parts (0.5 mole) of a terminal epoxide derived from an alkane containing about 11–14 carbon atoms. The mixture is heated under reflux for 5½ hours, and is then cooled and washed with water. After vacuum stripping of the solvent and filtration of the residue, there is obtained 98 parts of the $C_{11-14}$ episulfide.

EXAMPLE 3

Following the procedure of Example 1, 51 parts (0.5 mole) of 2-thiopyrrolidone is reacted with 177 parts (0.5 mole) of butyl epoxystearate in 200 parts of toluene, at reflux temperature (119° C.) for 1¼ hours. After washing, removal of solvent and filtration, there is obtained 173 parts of a clear yellow liquid comprising about 70% of the desired butyl epithiostearate.

EXAMPLE 4

Following the procedure of Example 1, 25 parts (0.25 mole) of 2-thiopyrrolidone is reacted with 18 parts (0.25 mole) of 1,2-butylene oxide in 50 parts of xylene. The reaction takes place over a 9½ hour period at temperatures from 43 to 93° C. The mixture is then washed with water, dried over magnesium sulfate and stripped. The final product, after filtration, comprises about 75% of the desired 1,2-epithiobutylene.

EXAMPLE 5

Following the procedure of Example 1, 0.5 mole of 2-thiopyrrolidone is reacted with 0.5 mole of styrene oxide in 50 parts of xylene, at about 120° C. The product is the desired epithiostyrene.

EXAMPLE 6

Following the procedure of Example 1, 0.5 mole of propylene oxide is reacted with 0.5 mole of 2-thiopyrrolidone in benzene, under pressure and at a temperature of about 75° C. The product is the desired propylene sulfide.

EXAMPLE 7

To a slurry of 32.2 parts (0.25 mole) of ε-thiocaprolactam in 50 parts of xylene is added 25.2 parts (0.35 mole) of 1,2-butylene oxide. The mixture is stirred for two days at temperatures ranging from 20° to 84° C. Upon hydrolysis and stripping of the solvent, a product is obtained which comprises about 60% of the desired 1,2-epithiobutylene.

EXAMPLE 8

The procedure of Example 7 is repeated, except that propylene oxide is substituted (on an equal molar basis) for the butylene oxide and the reaction is carried out under pressure to prevent volatilization of the propylene oxide. The product is the desired propylene episulfide.

As mentioned above, the episulfides prepared by the method of this invention are useful as monomers for the preparation of polymeric compositions. They may also be used as curing agents for epoxy resins. These uses are disclosed, for example, in U.S. Patents 3,378,522 and 3,396,173.

The episulfides are also useful as oxidation inhibitors, and for this purpose they may be incorporated in plastics, natural and synthetic lubricants and other compositions. Their utility as anti-oxidants for lubricants is shown by a test in which a lubricating oil containing the product of Example 2 is compared with a lubricating oil not containing said product, in a test wherein a weighed strip of copper-lead bearing metal is immersed in the lubricant at 320° F. A stream of humidified oxygen is blown through the lubricant for 18 hours, after which the metal strip is removed and weighed. Weight loss, in milligrams, is a measure of the oxidation which has taken place and therefore inversely of the oxidation inhibiting abilty of the episulfide.

The baseline lubricant used for comparison in this test contained 4% of the reaction product of the polyisobutenyl succinic acid with a polyethylene polyamine containing about 3-7 amino groups per molecule; 0.5% of the product obtained by alkylating acrylic acid with polyisobutenyl chloride, reacting the acid thus formed with pentaethylene hexamine, and subsequently reacting said product with terephthalic acid; and 0.1% of a hindered phenol antioxidant. When tested by the above method, the metal strip immersed in the baseline lubricant had a weight loss of 65.5 mg. A strip immersed in a similar lubricant, which additionally contained 1% of the product of Example 2, had a weight loss of only 2.4 mg.

The episulfides prepared by the method of this invention are also useful as chemical intermediates for the preparation of trithiocarbonates which are also excellent oxidation inhibitors. These trithiocarbonates are prepared by reacting the episulfide with carbon disulfide. A product thus obtained from the episulfide of Example 2, when incorporated into the baseline lubricating oil described above at 1% by weight, resulting in a metal strip weight loss of 1.7 mg.

What is claimed is:

1. A method for the preparation of an episulfide which comprises reacting, at a temperature of about 70–130° C., an epoxide with a thiolactam of the formula $$\begin{array}{c} \overset{\displaystyle [(CR_2)_n]}{\underset{\displaystyle H}{N}}\overset{\displaystyle }{\underset{\displaystyle }{\text{---}}}\overset{\displaystyle }{\underset{\displaystyle S}{C}} \end{array}$$

wherein each R is individually hydrogen or a lower alkyl radical and $n$ is an integer from 3 to 5.

2. A method according to claim 1 wherein the epoxide is a compound of up to 22 carbon atoms of the formula $$R^1\text{---}\underset{\displaystyle }{\overset{\displaystyle R^2}{C}}\underset{\displaystyle \diagdown O \diagup}{\text{------}}\underset{\displaystyle }{\overset{\displaystyle R^3}{C}}\text{---}R^4$$

wherein each of $R^2$ and $R^3$ are hydrogen and each of $R^1$ and $R^4$ is an alkyl radical which may be interrupted by an oxy or a carbonyloxy group.

3. A method according to claim 2 wherein the reaction is carrned out in the presence of an inert solvent.

4. A method according to any one of claims 1, 2 and 3 wherein the thiolactam is 2-thiopyrrolidone or ε-thiocaprolactam.

5. A method according to claim 4 wherein the thiolactam is 2-thiopyrrolidone.

References Cited

UNITED STATES PATENTS 2,094,914 10/1937 Dachlauer _____ 260—53

HENRY R. JILES, Primary Examiner

C. M. SHURKO, Assistant Examiner

U.S. Cl. X.R.

260—239,3; 252—406, 47